United States Patent [19]
Song et al.

[11] Patent Number: 6,045,931
[45] Date of Patent: *Apr. 4, 2000

[54] MAGNETIC RECORDING MEDIUM COMPRISING A COBALT-SAMARIUM MAGNETIC ALLOY LAYER AND METHOD

[75] Inventors: Xing Song; Ga-Lane Chen; Charles Chengyea Leu, all of Fremont, Calif.

[73] Assignee: Seagate Technology, Inc., Scotts Valley, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/922,360

[22] Filed: Sep. 3, 1997

Related U.S. Application Data

[60] Provisional application No. 60/028,498, Oct. 15, 1996.

[51] Int. Cl.$^7$ ........................................ G11B 5/66
[52] U.S. Cl. .................. 428/694 TS; 204/192.1; 427/130; 427/131; 427/132; 427/294; 427/331; 427/399; 428/336; 428/457; 428/629; 428/632; 428/639; 428/650; 428/667; 428/694 TP; 428/900; 428/928
[58] Field of Search ...................................... 427/131, 132, 427/129, 130, 331, 399; 204/192.1; 428/694 TS, 336, 457, 629, 632, 639, 650, 667, 694 TP, 900, 928

[56] References Cited

U.S. PATENT DOCUMENTS 5,846,648 12/1998 Chen et al. ............................. 428/332

OTHER PUBLICATIONS

Velu et al., "A Structure and Media Noise of SmCo/cr Thin Films and Hard Disks," J. Appl. Phys. 75(10), May 15, 1994, 1994 American Institute of Physics, pp. 6132–6134.

Murdock "Roadmap for 10 Gb/in2 Media: Challenges," IEEE Trans. Magn. vol. 28,, No. 5,pp. 3078–3083, Sep. 1992.

Kullman et al. "Amosphous COSM Thin Films : A New Material for High Density Longitudinal Recording," IEEE Trans, Magn., vol. 20, No. 2,pp. 420–424 Mar. 1984.

Velu et al. "CoSm–based high–coercivity thin films for longitudinal recording.," J. Appl. Phys. 69(8) pp. 5175–5177, Apr., 1991.

*Primary Examiner*—Bernard Pianalto
*Attorney, Agent, or Firm*—McDermott, Will & Emery

[57] ABSTRACT

A magnetic recording medium comprising a cobalt-samarium magnetic alloy layer is formed having a high aerial recording density and exhibiting high coercivity, utilizing an underlayer with a thin nucleation layer thereon. Embodiments include sputter depositing a Cr or Cr alloy underlayer on a non-magnetic substrate, including alternative substrates, and sputter depositing a thin nucleation layer comprising Cr or a Cr alloy on the underlayer. A CoSm alloy layer is sputter deposited on the nucleation layer under substantially the same inert gas pressure as the nucleation layer, whereby Cr diffuses from the nucleation layer into and alloys with the CoSm magnetic alloy layer, thereby increasing media coercivity and corrosion resistance, and reducing media noise. A Cr overcoat on a CoSm alloy layer greatly reduces the oxidation of CoSm, thereby improving its corrosion resistance.

22 Claims, 11 Drawing Sheets

CoSm/Cr system

FIG. 8A

CoSmCr/Cr/Cr system

MAGNETIC RECORDING MEDIUM COMPRISING A COBALT-SAMARIUM MAGNETIC ALLOY LAYER AND METHOD

RELATED APPLICATION

This application claims priority from provisional patent application Ser. No. 60/028,498, filed Oct. 15, 1996, the entire disclosure of which is hereby incorporated herein by reference.

TECHNICAL FIELD

The present invention relates to the recording, storage and reading of magnetic data, particularly rotatable magnetic recording media, such as thin film magnetic disks. The invention has particular applicability to a high density magnetic recording medium exhibiting high coercivity.

BACKGROUND ART

Thin film magnetic recording disks and disk drives are conventionally employed for storing large amounts of data in magnetizable form. Data are written onto and read from a rapidly rotating recording disk by means of a magnetic head transducer assembly that flies closely over the surface of the disk. The escalating requirements for high areal recording density and increasingly smaller disk drives impose increasingly demanding requirements on thin film magnetic recording media in terms of coercivity, remanence, coercivity squareness, low medium noise and narrow track recording performance. Considerable effort has been expended in recent years to produce magnetic recording media having high areal recording densities while satisfying such demanding requirements, particularly for longitudinal recording.

Figure 1:
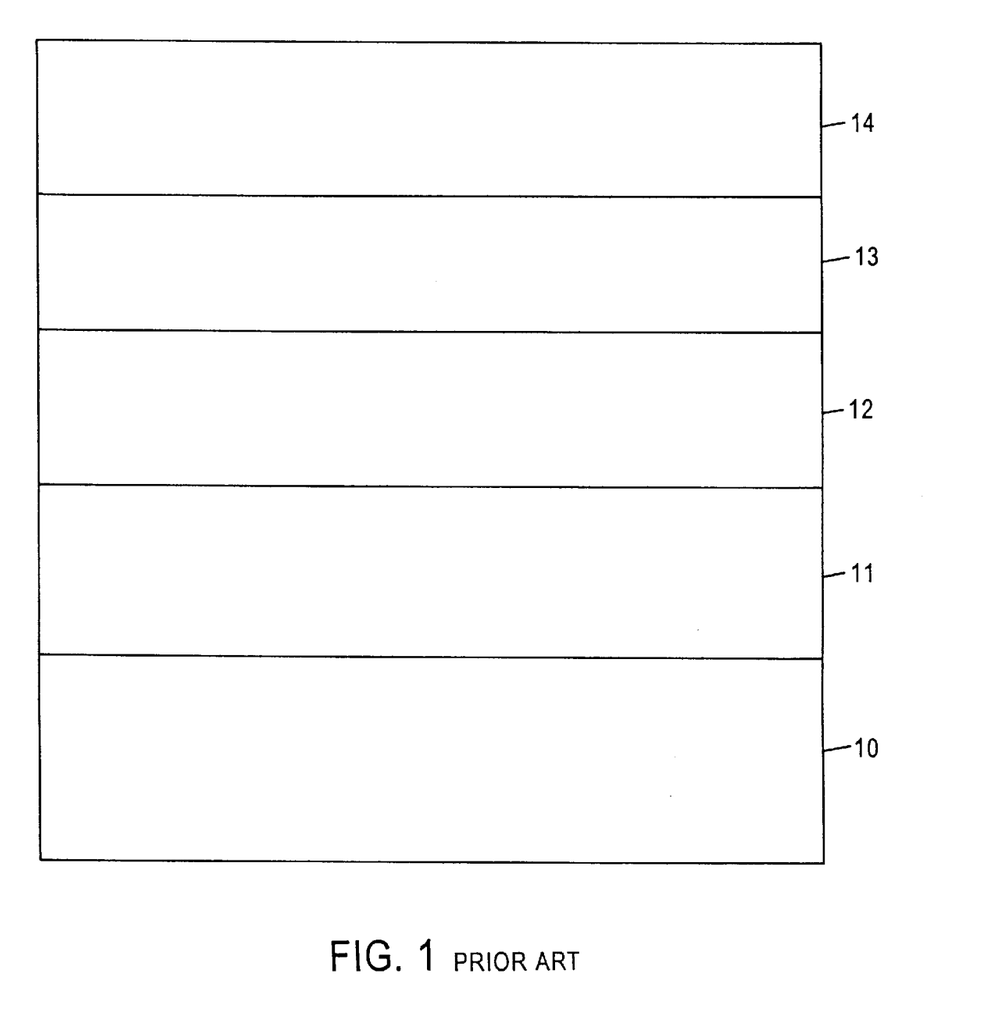
FIG. 1 schematically depicts a conventional magnetic recording medium structure.

In order to realize ultra-high areal recording density, magnetic recording media with high coercivity and small Mrt (magnetic remanence×film thickness) are needed. E. Murdock, "Roadmap for 10 Gb/in$^2$ Media: Challenges", IEEE Trans. Magn., Vol. 28, No. 5, pp. 3078–3083, Sep. 1992. Conventional magnetic recording media comprise a cobalt (Co)-based magnetic alloy layer, such as polycrystalline cobalt-chromium-tantalum (CoCrTa), cobalt-chromium-platinum (CoCrPt) or cobalt-chromium-tantalum-platinum (CoCrTaPt). A conventional magnetic recording medium structure is schematically depicted in FIG. 1 and comprises a non-magnetic substrate 10, typically a nickel-phosphorous (Ni—P) plated aluminum (Al) alloy, e.g., an aluminum-magnesium (Al—Mg) alloy, and sequentially formed thereon an underlayer 11, typically Cr or a Cr alloy, a magnetic alloy layer 12, typically a Co alloy, a protective overcoat 13, typically carbon or silicon dioxide, and a lubricant topcoat 14.

Figure 2:
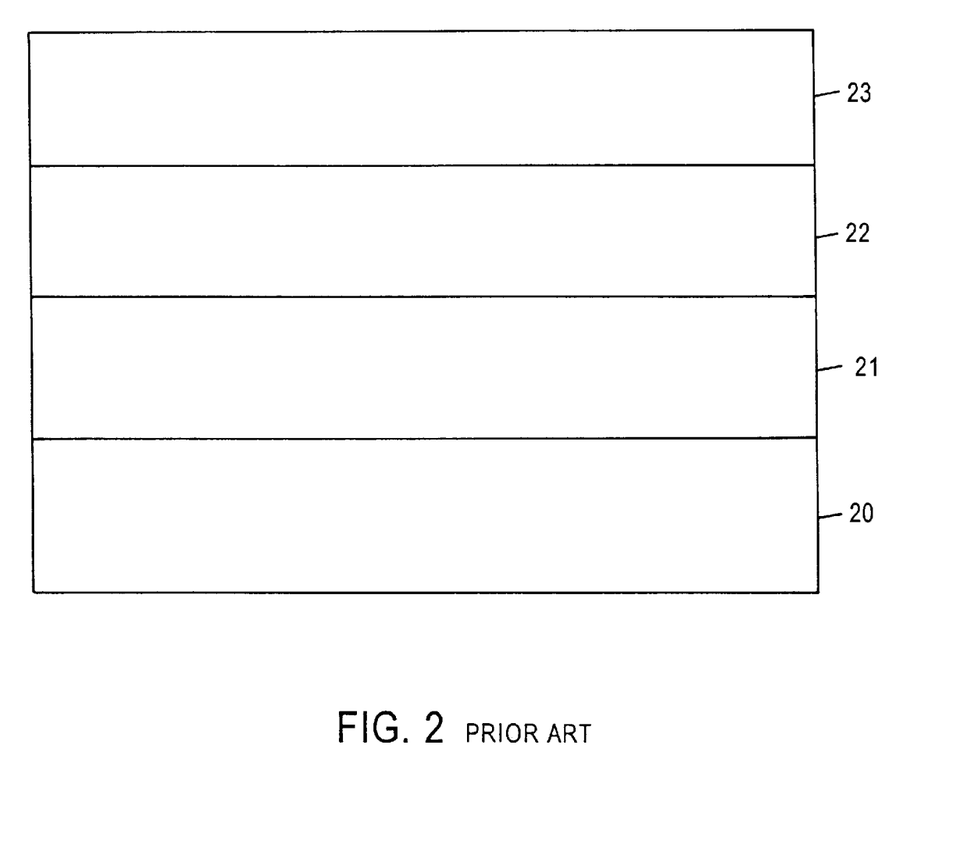
FIG. 2 schematically depicts a proposed magnetic recording medium structure comprising a CoSm magnetic alloy layer.

Cobalt-samarium (CoSm) magnetic alloy films are known to exhibit a high magnetic anisotropy constant and fine grain structures. U. Kullmann, E. Koester, and C. Dorsh, "Amorphous CoSm Thin Films: A New Material for High Density Longitudinal Recording", IEEE Trans. Magn., Vol. 20, No. 2, pp. 420–424, Mar. 1984. Accordingly, a CoSm magnetic alloy layer can be viewed as a potential candidate for high density longitudinal recording media. One such CoSm thin film containing magnetic recording medium has been attempted. E. M. T. Velu and D. N. Lambeth, "CoSm-based high-coercivity thin films for longitudinal recording", J. Appl. Phys. 69(8), pp. 5175–5177, Apr. 15, 1991. Such a potential CoSm thin film magnetic recording medium is schematically illustrated in FIG. 2 and comprises an alternate type non-magnetic substrate 20, such as a glass substrate, a Cr or Cr alloy underlayer 21, a CoSm magnetic alloy layer 22 and a protective carbon overcoat 23 thereon. Unfortunately, such a potential magnetic recording medium comprising a CoSm magnetic alloy layer exhibits low coercivity, e.g. about 2200–2300 Oersteads, and exhibits poor corrosion resistance.

There exists a need for a high areal density magnetic recording medium comprising a CoSm magnetic alloy layer which exhibits high coercivity and corrosion resistance.

DISCLOSURE OF THE INVENTION

An object of the present invention is a CoSm containing magnetic recording medium having a high areal recording density and exhibiting high coercivity and improved corrosion resistance.

A further object of the present invention is a method of manufacturing a CoSm magnetic recording medium having high aerial recording density and exhibiting high coercivity and high corrosion resistance.

Additional objects and other features of the invention will be set forth in part in the description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other objects are achieved in part by a magnetic recording medium comprising: a non-magnetic substrate; an underlayer formed on the non-magnetic substrate; a nucleation layer formed on the underlayer; and a cobalt-samarium magnetic alloy layer formed on the nucleation layer.

Another aspect of the present invention is a method of manufacturing a magnetic recording medium which comprises: depositing a non-magnetic underlayer on a non-magnetic substrate; forming a nucleation layer on the underlayer; and forming a cobalt-samarium magnetic alloy layer on the nucleation layer.

A further aspect of the present invention is a method of manufacturing a magnetic recording medium, which the method comprises: sputter depositing a Cr or Cr alloy layer on a non-magnetic substrate at a first inert gas pressure; sputter depositing a Cr or Cr alloy nucleation layer on the underlayer at a second inert gas pressure greater than the first inert gas pressure; sputter depositing a cobalt-samarium magnetic alloy layer on the nucleation layer under substantially the same sputter deposition conditions as the nucleation layer whereby Cr diffuses from the nucleation layer into and alloys with the cobalt-samarium magnetic alloy layer.

Additional objects and advantages of the present invention will be cumberly apparent to those skilled in this art from the following detailed description, wherein embodiments of the invention are described, simply by way of illustration of the best mode contemplated for carrying out the invention. As will be realized, the invention is capable of other and different embodiments, and its several details are capable of modifications in various obvious respects, or without departing from the invention. Accordingly, the drawings and description are to be regarded as illustrative in nature, and not as restricted.

BEST MODE FOR CARRYING OUT THE INVENTION

The present invention provides a magnetic recording medium for longitudinal recording having a high areal recording density of about 1 Gb/in$^2$ to about 10 Gb/in$^2$, exhibiting a high coercivity, such as about 3,000 to about 4,000 Oersteds, and a relatively low mrt, e.g. an Mrt of about 1.0 to about 1.1 memu/cm$^2$. In accordance with the present invention, such a high areal recording density in conjunction with high coercivity and corrosion resistance is achieved by depositing a CoSm magnetic alloy layer on a suitable nucleation layer.

Upon extensive experimentation and investigation in attempting to provide a magnetic recording medium comprising a CoSm magnetic alloy layer with high aerial recording density and high coercivity, two significant problems were encountered. It was found necessary to sputter deposit the underlayer, such as Cr or a Cr alloy, under conditions such that the deposited underlayer exhibits a (110) crystallographic orientation necessary for the growth of a high coercivity CoSm magnetic layer thereon. Upon further experimentation, it was found that in order to obtain high media coercivity, it was necessary to sputter deposit a Cr or Cr alloy underlayer at a relatively low inert gas, typically argon (Ar), pressure, e.g. about 5 mTorr to about 10 mTorr, e.g., about 5 mTorr. However, investigations also indicated that optimal inert gas pressures for sputter depositing the CoSm magnetic alloy layer to achieve high coercivity are significantly higher than that for sputter depositing the Cr underlayer, e.g., about 20 mTorr to about 30 mTorr, e.g., about 30 mTorr. Accordingly, in order to obtain high media coercivity, it was found necessary to increase the Ar pressure, as from about 5 mTorr to about 30 mTorr, after sputter depositing the Cr underlayer. However, during the time interval in which the Ar pressure is elevated, surface oxidation of the deposited Cr underlayer inevitably occurs, primarily due to residual oxygen present in the sputtering chamber. Such surface oxidation has a significant adverse effect on the magnetic properties of the subsequently sputter deposited thin CoSm magnetic alloy layer. Surface oxidation of the Cr underlayer has a negative impact on the growth of a high coercivity CoSm magnetic alloy layer. Thus, although CoSm magnetic thin films appeared promising, their practical utility in high areal recording density magnetic recording media was quite limited due to the serious adverse affect of inevitable underlayer oxidation on their magnetic properties.

Velu et al. similarly reported that the optimized Ar pressure during sputtering of CoSm to achieve high coercivity is about 20 mTorr, while they considered 10 mTorr the optimum pressure for the Cr underlayer. However, an increase of Ar pressure within a sputtering chamber from about 10 mTorr to about 20 mTorr inevitably results in underlayer surface oxidation. Transfer of the substrate with the deposited Cr underlayer to another sputtering chamber with a higher Ar pressure would also result in inevitable underlayer surface oxidation.

It was also found that CoSm magnetic alloy layers suffered from serious corrosion problems which adversely affect media coercivity. It was found that media coercivity drops within a short period of time subsequent to manufacture due to corrosion. Accordingly, the use of CoSm magnetic thin films in a magnetic recording media for the recording industry has not been practical.

Upon extensive experimentation and investigation, it was found that a magnetic recording medium having a high aerial recording density, e.g. about 1 Gb/in$^2$ to about 10 Gb/in$^2$, and exhibiting high coercivity, e.g., about 3,000 to about 4,000 Oersteds, can be formed utilizing a thin CoSm magnetic alloy layer with reduced oxidation and improved corrosion resistance. In accordance with the present invention, an underlayer, such as Cr or a Cr alloy, e.g., CrV, is sputtered deposited on a non-magnetic substrate under optimal conditions for maximizing media coercivity, i.e., at a low inert gas (Ar) pressure of about 5 mTorr to about 10 mTorr, e.g., about 5 mTorr. A CoSm magnetic alloy layer is subsequently sputter deposited under optimal conditions to maximize media coercivity, e.g., a high Ar pressure of about 20 mTorr to about 30 mTorr, e.g., about 30 mTorr. However, surface oxidation is greatly reduced at the interface between the CoSm magnetic alloy layer and the underlayer by sputter depositing on the underlayer a thin Cr nucleation layer under sputter deposition conditions similar to those employed for sputter depositing the CoSm layer, e.g., a high Ar pressure of about 30 mTorr, immediately after sputter depositing the nucleation layer. In this way, the underlayer is deposited under conditions selected to maximize media coercivity and obtain a (110) predominant crystallographic orientation. Any underlayer surface oxidation would be confined to the interface between the underlayer and the underlayer and, hence, does not adversely affect the magnetic properties of the CoSm layer grown on the nucleation layer.

The Cr underlayer sputter deposited in accordance with the present invention exhibits the desirable (110) predominant crystallographic orientation and, hence, the nucleation layer deposited on the underlayer also exhibits the desirable (110) predominant crystallographic orientation. A thin nucleation layer is then sputter deposited on the underlayer at a relatively high pressure corresponding to the pressure under which the cobalt-samarium magnetic alloy is deposited to achieve optimum coercivity. Accordingly, surface oxidation of the nucleation layer is reduced. Thus, in accordance with the present invention, both the underlayer and the CoSm layer are deposited under respective optimal conditions for maximizing media coercivity.

The nucleation layer employed in the present invention can comprise the same material as the underlayer, e.g. Cr or a Cr alloy such as CrV. The nucleation layer can be deposited at a thickness of about 10 Å to about 75 Å, e.g., about 25 Å to about 50 Å. The underlayer can be deposited at a thickness of about 500 Å to about 3,500 Å, e.g., about 750 Å to about 3,000 Å. As one having ordinary skill in the art would readily recognize, the sputter deposition conditions for the underlayer, and the nucleation and CoSm magnetic alloy layers, can be optimized in a particular situation. For example, a Cr underlayer can be sputter deposited at an Ar pressure of about 5 mTorr to about 10 mTorr, preferably about 5 mTorr, while the nucleation layer and the CoSm magnetic alloy layer can be deposited at an Ar pressure of about 20 mTorr to about 30 mTorr, such as about 30 mTorr.

In an embodiment of the present invention, the corrosion resistance of the CoSm magnetic alloy layer is improved by incorporating a suitable alloying element, such as Cr or Ta. The amount of alloying element can be optimized for corrosion resistance as well as for maximizing media coercivity and signal to noise ratio.

In another aspect of the present invention, a Cr or Cr alloy is employed as the nucleation layer. Upon sputter depositing the CoSm magnetic alloy layer under substantially the same inert pressure employed during sputter deposition of the nucleation layer, Cr diffuses into and alloys with the CoSm magnetic alloy layer, thereby providing significant advantages. Specifically, the addition of Cr as an alloying element in the CoSm magnetic alloy layer improves corrosion resistance, increases media coercivity and reduces media noise.

Figure 9A:
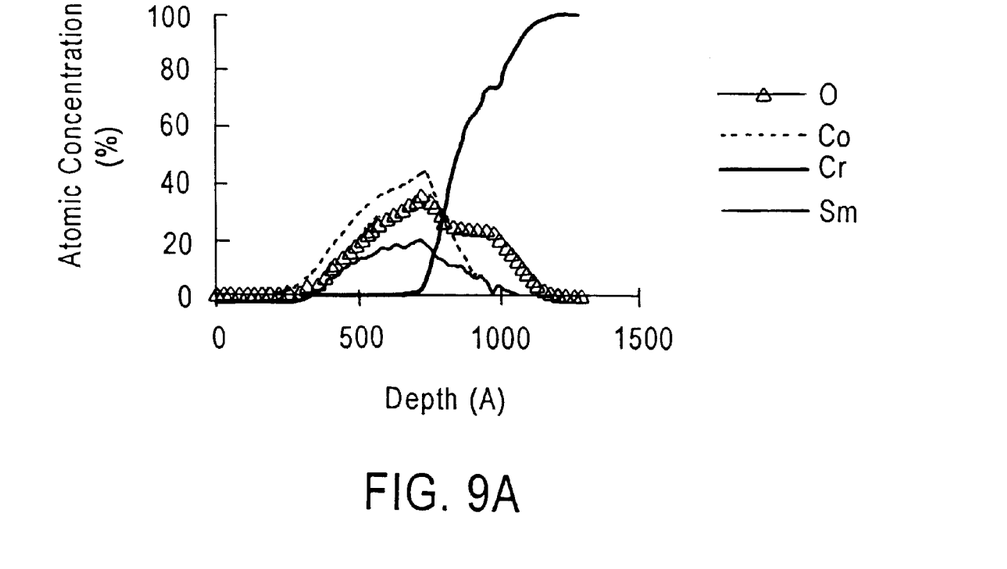
FIGS. 9A and 9B compare Auger depth profiles with and without a chromium overcoat as to oxygen levels in the CoSm films.
Figure 9B:
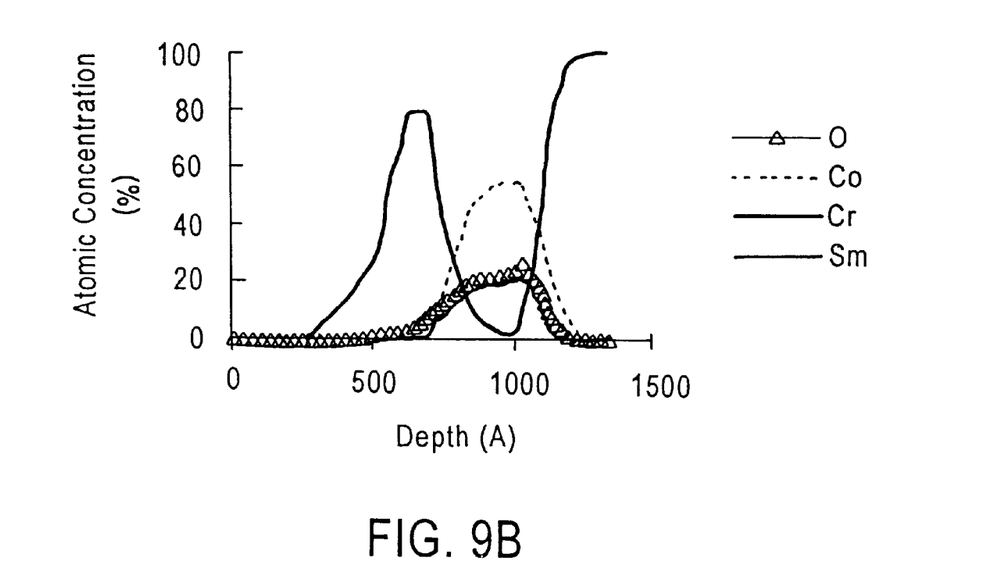

In another embodiment of the present invention, a corrosion resistance layer, such as Cr, a Cr alloy, Ta or a Ta alloy, is sputter deposited on the CoSmX magnetic alloy layer wherein X is an alloying element such as Cr. Adverting to FIG. 9A, the sample was sputtered without a Cr overcoat; whereas, in FIG. 9B the same sample was sputtered with a Cr overcoat having a thickness of about 150 Å. The oxygen level in the CoSm film of the sample sputtered with the Cr overcoat was reduced from about 40 at. % to about 20 at. % compared with a similar sample sputtered without a Cr overcoat. No Hcr drop was observed for 96 hours for the sample sputtered with a Cr overcoat, while a Hcr drop of about 6.7% was observed for the sample sputtered without a Cr overcoat.

As in a conventional magnetic recording media, a protective overcoat can be deposited on the CoSm magnetic alloy layer or on the optional corrosion resistant layer if present. The protective overcoat can be deposited by any conventional means, such as sputtering, and may comprise zirconium oxide ($ZrO_2$), carbon, including hydrogenated carbon, silicon carbite (SiC) or a carbon nitride (CN). The protective overcoat is provided in a thickness suitable to protect the underlying layers. An overcoat having a thickness of about 50 Å to about 300 Å, such as about 100 Å to about 200 Å, has been found suitable.

As in conventional magnetic recording media, a layer of a lubricant can be applied on and bonded to the protective overcoat. The lubricant topcoat can be provided in any suitable thickness. A lubricant thickness of about 5 Å to about 50 Å, such as about 10 Å to about 20 Å, has been found suitable. Conventional lubricant topcoat materials suitable for use in the present invention include Z-dol, AM-2001 and X-IP.

Figure 3:
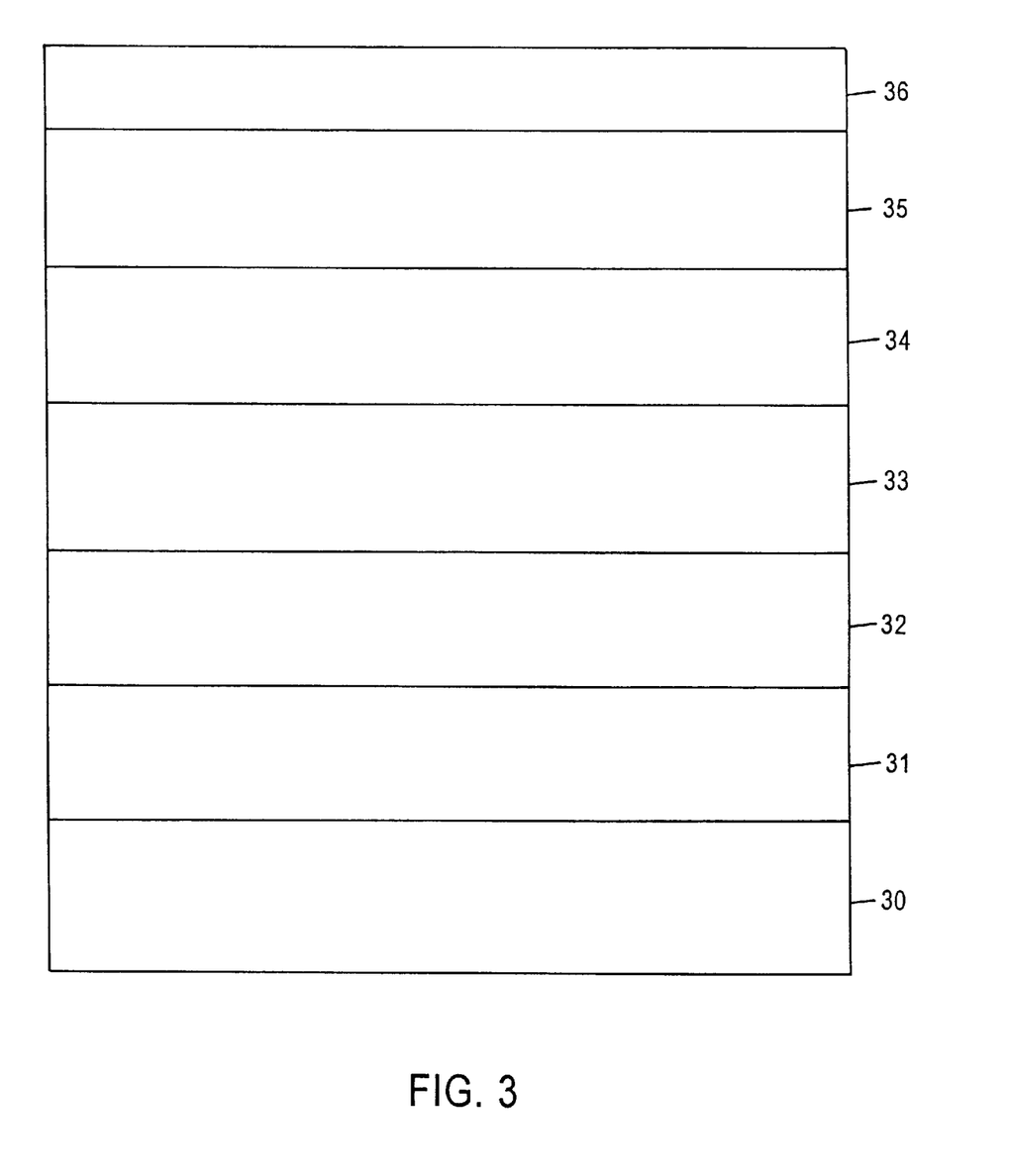
FIG. 3 schematically depicts a magnetic recording medium in accordance with an embodiment of the present invention.

A magnetic recording medium in accordance with the present invention is schematically illustrated in FIG. 3 and comprises a substrate 30 with an underlayer 31 formed thereon. A thin nucleation layer 32 is deposited on the underlayer 31 and a magnetic CoSmX alloy 33 is sputter deposited thereon. The alloying element X can be Cr, Ni, or Pt, and can result from diffusion from the nucleation layer. A CoSmCr magnetic alloy layer can be formed by sputter depositing a CoSm magnetic alloy layer under the same inert gas pressure as an underlying Cr or Cr alloy nucleation layer, whereby Cr diffuses into and alloys with the CoSm layer to form a CoSmCr magnetic alloy layer 33. An optional corrosion resistant layer 34 can be applied to the CoSmX magnetic alloy layer 33. A conventional overcoat 35 and lubricant topcoat 36 can be subsequentially deposited thereon.

Figure 4:
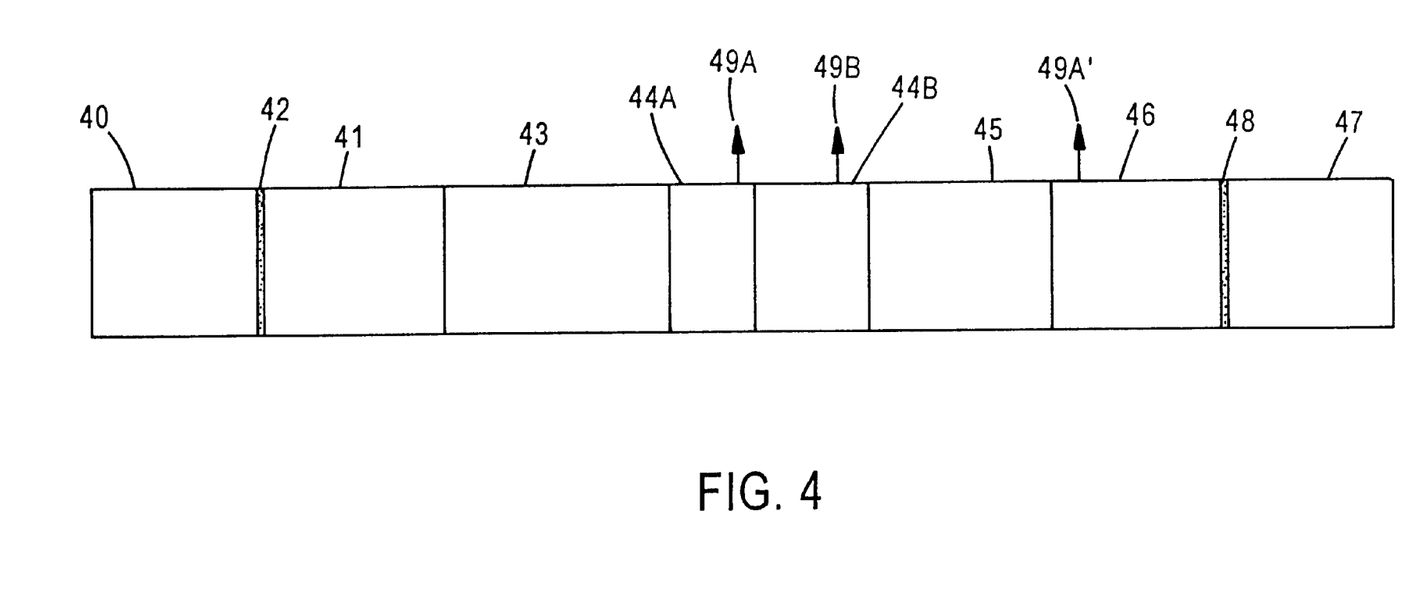
FIG. 4 schematic ally illustrates a sputtering system employed in the present invention.

A method of manufacturing a magnetic recording medium in accordance with the present invention can advantageously be conducted in any of various conventional sputtering systems, such as that illustrated in FIG. 4, schematically depicting a CPA sputtering system manufactured by Circuit Processor Apparatus Co., of Fremont, Calif. Adverting to FIG. 4, the depicted sputtering system comprises load chamber 40 and adjacent heating chamber 41 comprising heating lamps, typically six heating lamps. After passing through gate valve 42, heating chamber 41 and passby chamber 43, the substrate enters the first deposition chamber where the Cr target 44A and CoSm target 44B are positioned. DC power supply 49A is connected to Cr target 44A, while RF power supply 49B is connected to CoSm target 44B.

In accordance with the present invention, the underlayer, e.g., Cr, is sputter deposited at a low Ar pressure, e.g., about 5 mTorr. Subsequently, the substrate with underlayer deposited thereon is withdrawn from second passby chamber 45 to passby chamber 43, wherein the conditions are optimized for maximizing media coercivity, e.g., a high Ar pressure of about 30 mTorr in the first deposition chamber. A thin nucleation layer, e.g., Cr, is then sputter deposited on the underlayer and a CoSm magnetic alloy layer is immediately deposited on the thin nucleation layer under the same inert gas pressure employed to deposit the nucleation layer. Cr from the nucleation layer diffuses into and alloys with the CoSm magnetic alloy layer forming a CoSmCr magnetic alloy layer.

In an alternative embodiment, target 44B comprises a CoSmX magnetic alloy, wherein X is an alloying element, such as Cr, Ni, or Pt. The alloying element X serves to increase media coercivity, reduce media noise and reduce media corrosion. In this embodiment, reliance need not be placed exclusively upon diffusion of an alloying element from the nucleation layer into the CoSm magnetic alloy layer.

After deposition of the CoSmX magnetic alloy layer, a protective overcoat is deposited in chamber 46, such as from a carbon target to which a DC power supply 49A is connected. After depositing the protective overcoat, the magnetic recording medium passes through gate valve 48 into unload chamber 47. For simplification, the apparatus illustrated in FIG. 4 does not contain chambers or targets for depositing a corrosion resistance layer.

EXAMPLE

For comparison purposes, two magnetic recording media samples were prepared under substantially the same conditions employing substantially the same materials, except for the omission of a thin nucleation layer in one sample. For simplicity of understanding, a corrosion resistant layer, protective overcoat and lubricant topcoat were not employed. The apparatus employed in preparing the comparison samples is substantially the same as that depicted in FIG. 4. In each case, deposition was conducted under substantially the same conditions, using an Ohara 65 mm glass disk as a substrate, and a $Co_{0.75}$ $Sm_{0.25}$ target of 14.719"×3.594"×0.25". A DC power supply was employed to sputter deposit the Cr layers and an RF power supply was employed to sputter deposit the CoSm layers.

Sample A, representative of the present invention and identified as laboratory Sample CS99S6, was prepared by sequentially sputter depositing, on the Ohara glass substrate, a Cr underlayer of about 3,000 Å, a Cr nucleation layer of about 50 Å, and a CoSm magnetic alloy layer of about 250 Å. Cr diffused from the nucleation layer resulting in a CoSmCr magnetic alloy layer. For comparison purposes, Sample B, identified as laboratory Sample CS910S1, was prepared in substantially the same manner as Sample A, except that a Cr nucleation layer was not deposited on the Cr underlayer. The resulting magnetic recording medium (Sample B) comprised the Ohara glass substrate and, sequentially formed thereon, a Cr underlayer of about 3,000 Å and a CoSm magnetic alloy layer of about 250 Å. In the absence of a Cr nucleation layer applied under substantially the same conditions as the CoSm magnetic alloy layer, as in preparing Sample A, there was little diffusion of Cr into the CoSm layer.

The methodology employed in fabricating the comparison samples comprised initially reducing the background pressure in the chambers below about $2 \times 10^{-7}$ Torr, and then heating the pallet with the Ohara glass substrate thereon to about 250° C. in heating chamber 41 (FIG. 4). The pallet, with the Ohara glass substrate thereon, was then conveyed to the first deposition chamber wherein a thick Cr underlayer of about 3,000 Å was sputter deposited under the following conditions:

Cr underlayer deposition:
DC power~4000 W
Drive speed~6 IPM
Ar pressure~5 mTorr
Thickness~3000 Å

The pallet was then withdrawn into the first passby chamber 43, wherein the Ar pressure was increased to about 30 mTorr, and a thin Cr nucleation layer and CoSm magnetic alloy layer consecutively sputter deposited under the following conditions:

| Thin Cr nucleation layer deposition | CoSm magnetic alloy layer deposition |
|---|---|
| DC power ~ 100 W | RF power ~ 400 W |
| Drive speed ~ 4.2 IPM | Drive speed ~ 4.2 IPM |
| Ar pressure ~ 30 mTorr | Ar pressure ~ 30 mTorr |
| Thickness ~ 50 Å | Thickness ~ 250 Å |
| | Mrt ~ 1.0–1.1 memu/cm$^2$ |

During this procedure, Cr diffused into the CoSm magnetic alloy layer forming a CoSmCr magnetic alloy layer as revealed by SIMS analysis.

Figure 5A:
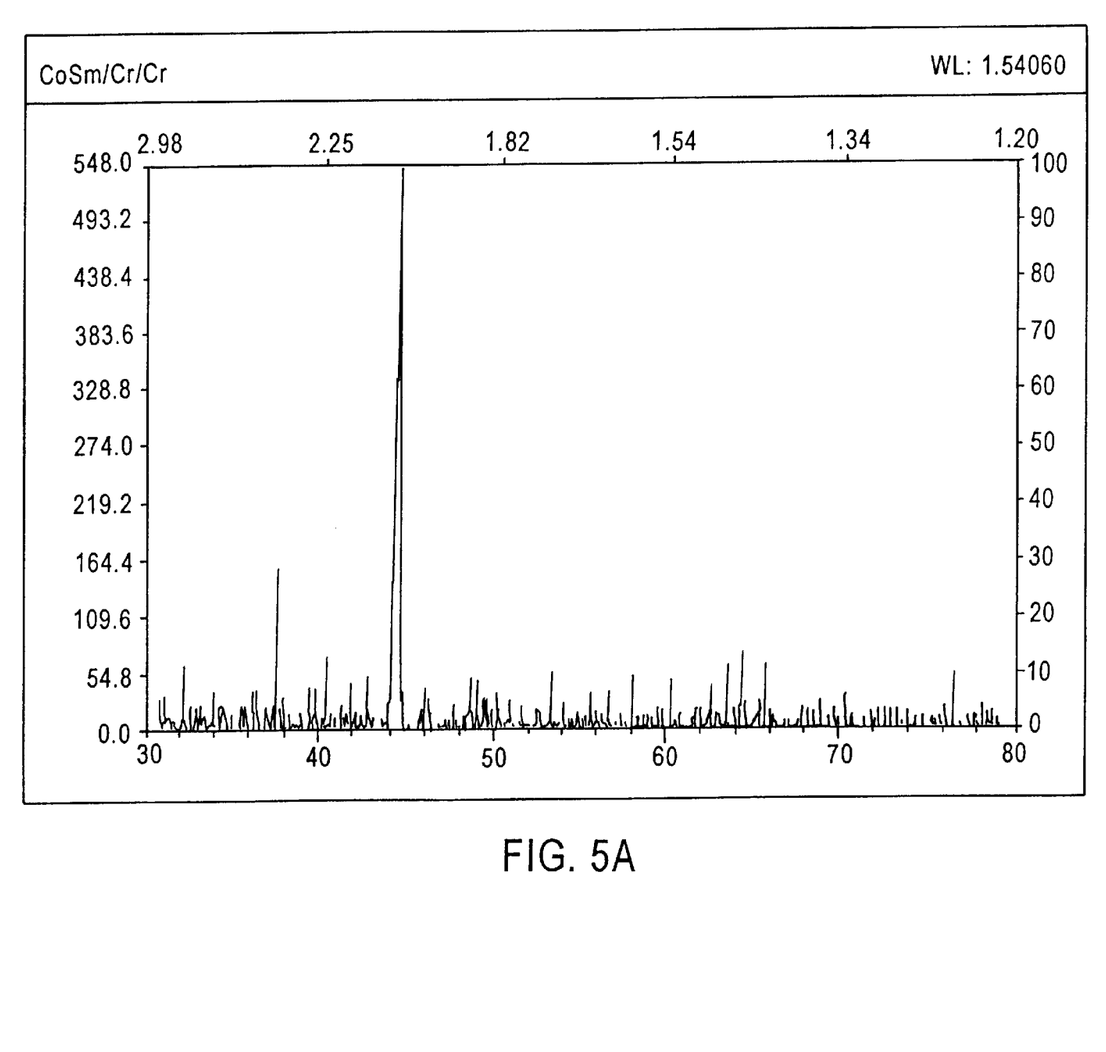
FIGS. 5A and 5B show X-ray diffraction patterns of tested samples.
Figure 5B:
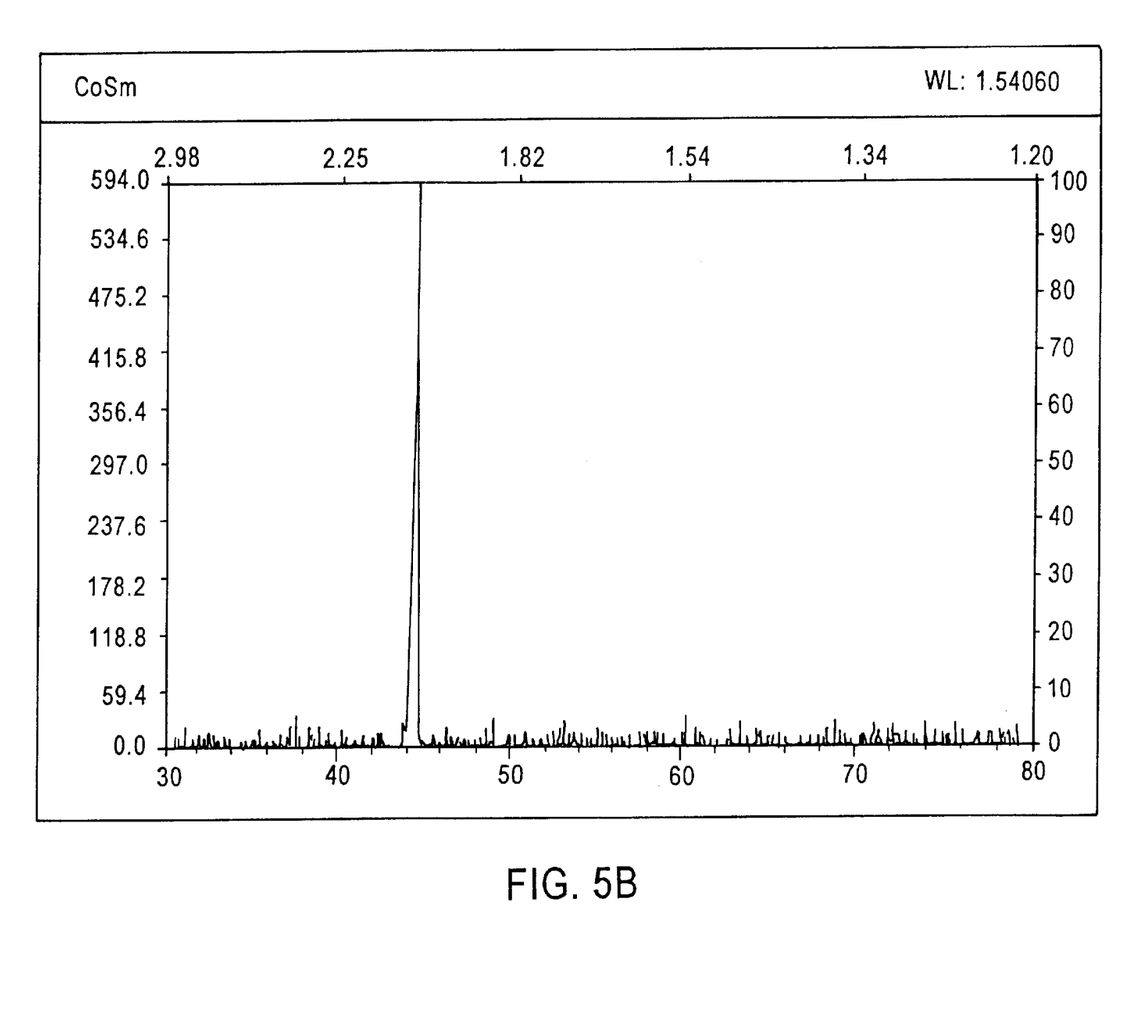

The principal difference between the Sample A and Sample B is that a thin Cr nucleation layer was not sputter deposited on the Cr underlayer of Sample B. Sample A and Sample B were subjected to analysis using X-ray diffraction, RMM (Remanent Moment Magnetometer), VSM (Vibrating Sample Magnetometer), and Quad SIMS (Secondary Ion Mass Spectrometer). FIG. 5A shows the X-ray diffraction pattern of Sample A; FIG. 5B shows the X-ray diffraction pattern of Sample B. In each case, only the (110) predominant Cr crystallographic peak was detected, apparently due to the conditions under which the Cr underlayer was sputter deposited, i.e., low Ar pressure.

Figure 6:
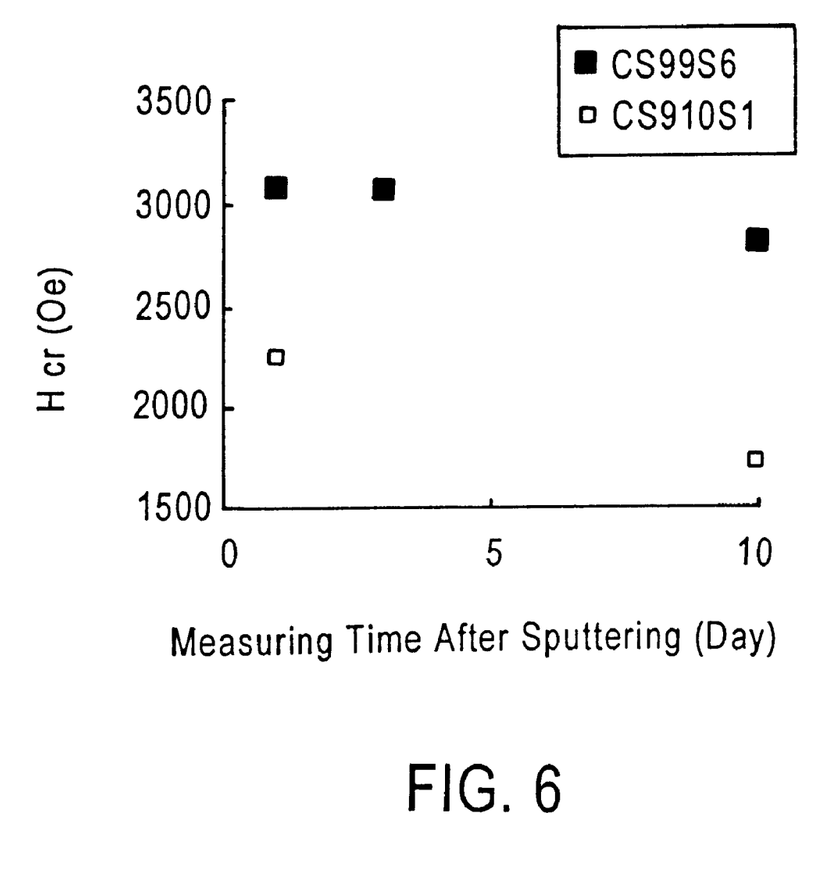
FIG. 6 shows the coercivities of tested samples.

FIG. 6 shows the values of Hcr (remanent coercivity) obtained from Sample A (CS99S6) and Sample B (CS910S1). It is apparent that a high Hcr of about 3100 Oe was obtained from Sample A with an Mrt of about 1.0 emu/cm$^2$. On the other hand, Sample B exhibited an Hcr of about 2250 Oe with a similar Mrt. It is further observed from FIG. 6 that Sample A exhibits a significantly smaller Hcr drop.

Figure 7A:
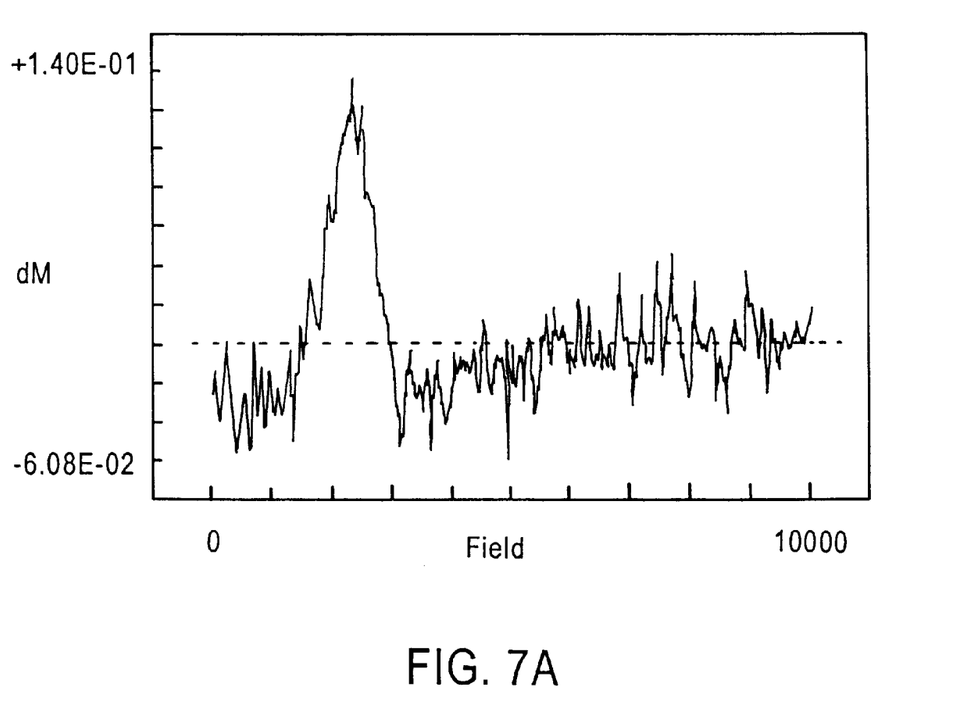
FIGS. 7A and 7B show ΔM curves of tested samples.
Figure 7B:
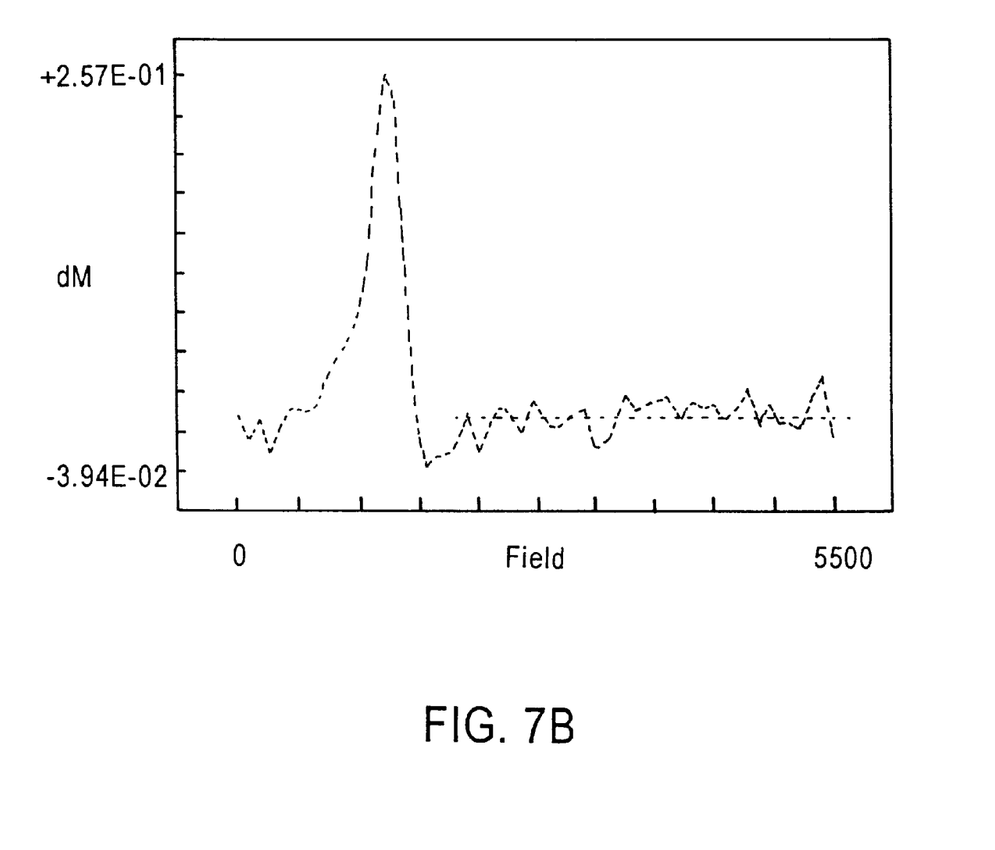

FIG. 7A shows the ΔM (remanent magnetization) curve of Sample A, while FIG. 7B shows the ΔM curve of Sample B, each measured after sputter deposition of the magnetic alloy layer. The peak in Sample A is about 50 percent smaller than that in Sample B. indicating reduced intergrannular interaction.

Figure 8A:
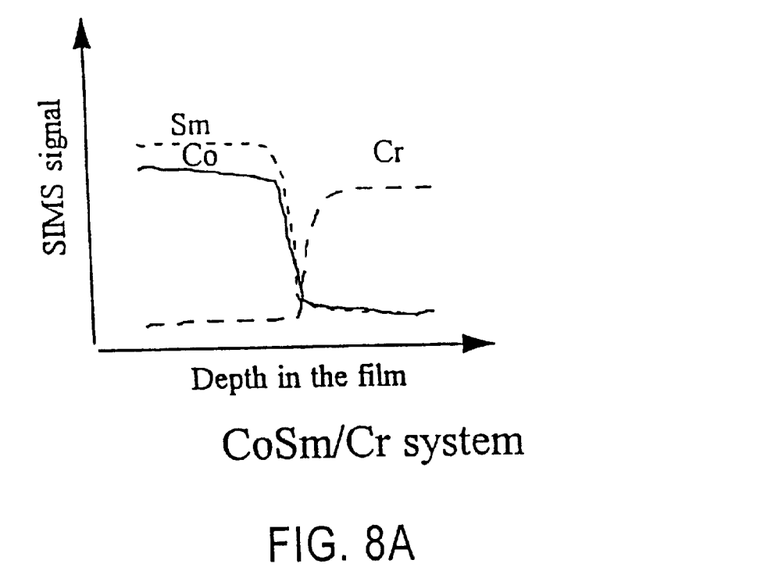
FIGS. 8A and 8B compare the quad SIMS analysis of tested samples.
Figure 8B:
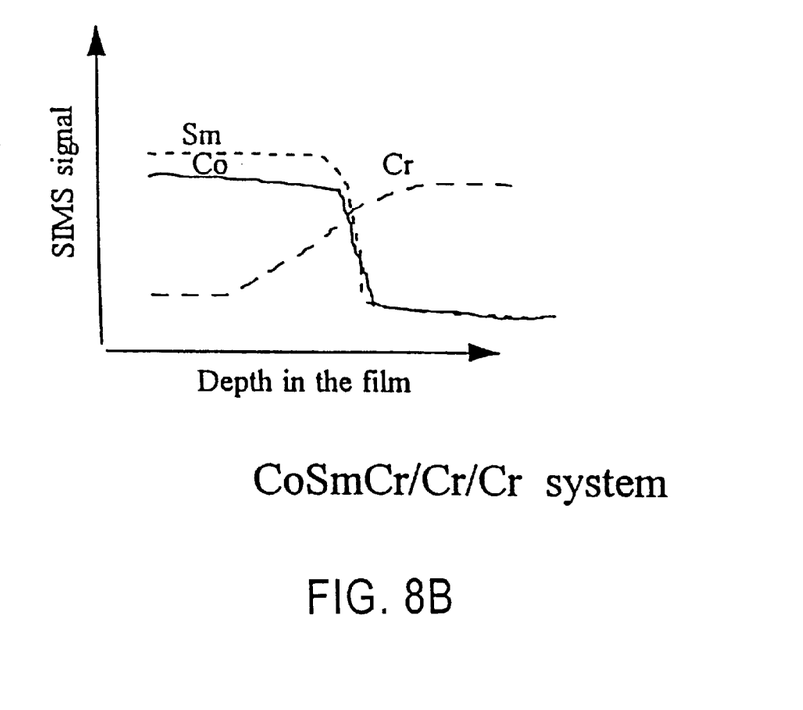

FIG. 8A shows the Quad SIMS analysis for Sample B; while FIG. 8B shows the Quad SIMS analysis for Sample A. Sample A exhibited a significantly wider interface, indicating interdiffusion. Neither Sample A nor Sample B exhibited a sharp interface, suggesting that some SIMS mixing effects may be present.

It should be apparent from the foregoing comparison that the multilayer magnetic recording medium of the present invention comprising a thin nucleation layer exhibits a high coercivity, low media noise (indicated by a small ΔM peak) and improved corrosion resistance.

The present invention also comprises a magnetic recording medium having sequentially deposited on the magnetic alloy layer, a corrosion resistance layer, a protective overcoat, typically carbon, and a lubricant topcoat, such as Z-dol, AM-2001, or X-1 P. The magnetic recording medium produced in accordance with the present invention can be used for ultra high density recording in the range of about 1 to about 10 Gb/in$^2$. High coercivities on the order of 3000–4000 Oe with an Mrt of about 1.0 can be obtained.

The present invention is not limited to the particular materials disclosed herein for the underlayer, nucleation layer or alloying element X for the CoSmX magnetic alloy layer. Given the present disclosure, one having ordinary skill in the art can easily employ other materials for such components. For example, the alloying element X can comprise Cr, Ni, Pt, or Ta. The underlayer and nucleation layer can comprise Cr, a Cr alloy such as CrV, CrTi, CrMo or CrTiB. The present invention can advantageously employ any various substrate materials, conventionally employed in the manufacture of magnetic recording media, including glasses, ceramics, glass-ceramics, as well as a conventional Ni—P plated Al or Al alloy.

Only certain embodiments of the invention and but a few examples of its versatility are shown and described in the present disclosure. It is to be understood that this invention is capable of use in various other combinations and environments and is capable of changes or modifications within the scope of the inventive concept as expressed herein.

What is claimed is:

1. A magnetic recording medium comprising:
   a non-magnetic substrate;
   an underlayer formed on the non-magnetic substrate exhibiting a (110) predominant crystallographic orientation;
   a nucleation layer formed on the underlayer with an interface therebetween; and
   a cobalt-samarium magnetic alloy layer formed on the nucleation layer.

2. The magnetic recording medium according to claim 1, wherein the underlayer comprises chromium or a chromium alloy, and the nucleation layer comprises chromium or a chromium alloy.

3. The magnetic recording medium according to claim 2, wherein the chromium alloy is a chromium vanadium alloy.

4. The magnetic recording medium according to claim 2, wherein the underlayer is sputter deposited at a first inert gas pressure, and the nucleation layer is sputter deposited at a second inert gas pressure greater than the first inert gas pressure.

5. The magnetic recording medium according to claim 4, wherein the first inert gas pressure is about 5 mTorr and the second inert gas pressure is about 30 mTorr.

6. The magnetic recording medium according to claim 1, wherein the thickness of the underlayer is about 500 Å to about 3,500 Å, and the thickness of the nucleation layer is about 10 Å to about 75 Å.

7. The magnetic recording medium according to claim 6, wherein the thickness of the underlayer is about 750 Å to about 3,000 Å and the thickness of the nucleation layer is about 25 Å to about 50 Å.

8. The magnetic recording medium according to claim 1, wherein the underlayer has an oxidized surface at the interface with the nucleation layer.

9. The magnetic recording medium according to claim 1, exhibiting a media coercivity of about 3,000 to about 4,000 Oersteds and an aerial recording density of about 1 to about 20 Gb/in$^2$.

10. The magnetic recording medium according to claim 1, wherein the substrate comprises a glass or a glass-ceramic material or a nickel-phosphorus coated aluminum or aluminum alloy substrate.

11. The magnetic recording medium according to claim 1, wherein the cobalt-samarium magnetic alloy layer comprises chromium, nickel, tantalum or platinum.

12. The magnetic recording medium according to claim 11, comprising a chromium or chromium alloy underlayer.

13. The magnetic recording medium according to claim 1, further comprising a corrosion resistant layer comprising chromium, a chromium alloy, tantalum, or a tantalum alloy formed on the cobalt-samarium magnetic alloy layer.

14. A method of manufacturing a magnetic recording medium, which method comprises:

depositing a non-magnetic underlayer on a non-magnetic substrate;

forming a nucleation layer on the underlayer with an interface therebetween; and depositing a cobalt-samarium magnetic alloy layer on the nucleation layer.

15. The method according to claim 14, comprising:

sputter depositing a chromium or chromium alloy underlayer at a first inert gas pressure; and sputter depositing a chromium or chromium alloy nucleation layer on the underlayer at a second inert gas pressure greater than the first inert gas pressure.

16. The method according to claim 15, wherein the underlayer has an oxidized surface at the interface with the nucleation layer.

17. The method according to claim 15, wherein the first inert gas pressure is about 5 mTorr to about 10 mTorr, and the second inert gas pressure is about 20 mTorr to about 30 mTorr.

18. The method according to claim 17, wherein the first inert gas pressure is about 5 mTorr, and the second inert gas pressure is about 30 mTorr.

19. The method according to claim 15, comprising sputter depositing the cobalt-samarium alloy on the nucleation layer under the same inert gas pressure as the nucleation layer, whereby chromium diffuses from the nucleation layer into and alloys with the cobalt-samarium magnetic alloy layer.

20. The method according to claim 14, comprising:

sputter depositing the non-magnetic layer at a thickness of about 500 Å to about 3,500 Å; and sputter depositing the nucleation layer on the underlayer at a thickness of about 10 Å to about 75 Å.

21. The method according to claim 20, comprising:

sputter depositing the underlayer at a thickness of about 250 Å to about 3,000 Å; and sputter depositing the nucleation layer on the underlayer at the thickness of about 25 Å to about 50 Å.

22. The method according to claim 14, comprising sputter depositing the underlayer under conditions such that it exhibits a (110) predominant crystallographic orientation.

* * * * *